(12) United States Patent
Lahaije et al.

(10) Patent No.: US 6,484,090 B1
(45) Date of Patent: Nov. 19, 2002

(54) METHOD FOR PRODUCING A STORAGE MEDIUM WITH A MAP

(75) Inventors: Paul Dominique Marie Etienne Lahaije, Maastricht (NL); Ernst-Peter Neukirchner; Hans-Ulrich Otto, both of Hildesheim (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/674,940
(22) PCT Filed: May 5, 1999
(86) PCT No.: PCT/EP99/03073
§ 371 (c)(1),
(2), (4) Date: Jan. 16, 2001
(87) PCT Pub. No.: WO99/58934
PCT Pub. Date: Nov. 18, 1999

(30) Foreign Application Priority Data

May 8, 1998 (EP) ............................................. 98201459

(51) Int. Cl.[7] .............................................. G01C 21/20
(52) U.S. Cl. ...................................................... 701/208
(58) Field of Search ................................ 701/200, 208, 701/211, 212; 340/995, 990; 707/100, 102, 104

(56) References Cited

U.S. PATENT DOCUMENTS

| 4,888,698 | A | | 12/1989 | Driessen et al. | |
|---|---|---|---|---|---|
| 5,754,846 | A | * | 5/1998 | Janse et al. | ................. 395/611 |
| 5,974,419 | A | * | 10/1999 | Ashby | ........................ 707/100 |
| 6,169,956 | B1 | * | 1/2001 | Morimoto et al. | .......... 701/209 |
| 6,184,823 | B1 | * | 2/2001 | Smith et al. | ........... 342/357.13 |

FOREIGN PATENT DOCUMENTS

EP    0 838 663 A2    4/1998

\* cited by examiner

Primary Examiner—Michael J. Zanelli
(74) Attorney, Agent, or Firm—Mayer, Brown, Rowe & Maw

(57) ABSTRACT

A digital map with line features is stored on a storage medium into parcels, each covering a certain area of the map. A parcel has around it standard border a border region bounded by an inner border and an outer border. A line feature crossing the standard border between two neighboring parcels is only divided into two new line features if it completely crosses the border region, i.e. if it crosses the outer border of both neighboring parcels.

9 Claims, 4 Drawing Sheets

METHOD FOR PRODUCING A STORAGE MEDIUM WITH A MAP

BACKGROUND OF THE INVENTION

1. Field of the Invention

The present invention relates generally to the field of data storage techniques. More specifically, the present invention is directed to improved systems and methods for storing geographic data to provide improved efficiency and simpler access to the underlying data.

2. Description of the Related Art

The known car navigation systems require a map with digital road data on a removable storage medium, e.g. a CD-ROM, in order to realize functionality such as calculations of routes between a start and a destination point and displaying a road map on a display screen. In most cases the amount of data to be processed is very large and can be some hundreds of Megabytes. On the other hand, the embedded computer system in the navigation system has very restricted system memory capacity, e.g. 4 Megabytes, which is shared among the various components, such as the operating system and the application software. Therefore, the required amount of digital road data cannot be loaded from the storage medium into the system in one step but is structured in smaller units which can be processed by the computer system. The method of structuring is called parceling and a unit of road data is called a parcel. In addition to this parceling, the application software requires the organization of the road data in several levels to cover different scales for map display and different densities of the road network for route planning. For example, the most detailed level contains road data corresponding to city maps, a less detailed level only contains connector roads between cities and villages and the least detailed level only contains freeways and motorways. The number of levels is not fixed and depends on the characteristics of the area of which the map with road data is stored. The parceling is applied to each level of the map independently.

The method of parceling is described in U.S. Pat. 4,888,698. In that patent, a pattern of rectangular parcels is defined covering the map of which the road data are to be stored, whereby each parcel covers a particular part of the map. The size for the area of a parcel is chosen in such a way that the amount of data stored in the parcel does not exceed a certain maximum amount. The size of this area may be different for different parcels at the same level of the map. So a parcel covering a part of a city may have a small corresponding area whereas a parcel covering a less populated part may have a much larger corresponding area. A map contains line features which extend between two nodes and which have a certain geographical extension, e.g. a part of a road running between two intersections. If such a line feature crosses the border between two parcels, in the known method the line feature is divided into two new line features by adding an additional node at that border and the two new line features together with their nodes are stored into the two parcels. This method has some undesired effects. First, storing the additional nodes requires extra storage space without holding any information about the map itself. In practical situations, the number of additional nodes stored in a parcel can be 20% of the total number of nodes in that parcel. Furthermore, an application program using the stored map requires extra computational effort for processing the additional nodes. For instance, for constructing a route the line features are linked together and every additional node requires an additional link to be made.

SUMMARY OF THE INVENTION

It is an object of the invention to provide a method of the kind set forth which produces a storage medium with a reduced number of additional nodes compared with the known method. This object is achieved according to the invention in a method which is characterized in that each of the parcels has around its standard border a border region bounded by an inner border and an outer border, whereby the inner border of a particular parcel coincides with the outer border of its neighboring parcel in the pattern; and that the step of determining whether the line feature needs to be divided includes determining whether the line feature is fully enclosed by the outer border of a particular parcel and, if this is not the case, deciding that the line feature is to be divided. By making a border region for a parcel and by allowing a line feature to intersect the standard border and not to divide it as long as it remains inside the border region, the number of divided line features and consequently the number of additional nodes is reduced. In the method according to the invention, the network of roads is not sharply cut at the borders between the parcels but the topology of the network is taken into account by checking whether there are 'natural' break points in the network in the form of existing nodes near that border. If such break point exists, there is no need to cut the network at an artificial place and there is no need to place an additional node in the network. This advantage is achieved while maintaining the basic regular structure of parcels, which is advantageous for processing the map data, e.g. for displaying the map. The minor disadvantage that a feature at a geographical position in the border region of a parcel may not be stored in that parcel but in its neighboring parcel, can be resolved by retrieving that neighboring parcel.

Adding the additional node to an existing intermediate point has the advantage that no complete new item of information has to be stored. This saves storage space on the storage medium.

It is a further object of the invention to provide a system for producing a storage medium with a map of the kind set forth which produces a storage medium with a reduced number of additional nodes compared with the known system. This object is achieved according to the invention in a system that is characterized in that each of the parcels has around its standard border a border region bounded by an inner border and an outer border, whereby the inner border of a particular parcel coincides with the outer border of its neighboring parcel in the pattern; and that the means for determining whether the line feature needs to be divided are arranged to determine whether the line feature is fully enclosed by the outer border of a particular parcel and, if this is not the case, to decide that the line feature is to be divided. The reduction of the number of additional nodes on the storage medium is advantageous in that it saves storage space and computational effort in the application program using the line features from the storage medium.

It is a further object of the invention to provide a storage medium of the kind set forth with a reduced number of additional nodes compared with the known storage medium. This object is achieved according to the invention in a storage medium that is characterized in that each of the parcels has around its standard border a border region bounded by an inner border and an outer border, whereby the inner border of a particular parcel coincides with the outer border of its neighboring parcel in the pattern, and that the line feature intersects the standard border of a particular parcel while being fully enclosed in the outer border of that parcel. Such storage medium has fewer additional nodes for a given map, since fewer line features have been divided into multiple line features. A line feature is allowed to intersect the standard border, whereby it has not been divided if it does not intersect the outer border as well. So as long as the line feature does not completely cross the border region, it has not been divided. Apart from saving storage space, the storage medium according to the invention also has the advantage that a system using the map data from that storage medium requires less computational effort to process the line features.

It is a further object of the invention to provide a system of the kind set forth which is arranged to read a storage medium with a map according to the invention. This object is achieved according to the invention in a system that is characterized in that each of the parcels has around its standard border a border region bounded by an inner border and an outer border, whereby the inner border of a particular parcel coincides with the outer border of its neighboring parcel in the pattern; and that the reading unit is arranged to read a line feature intersecting the standard border of a particular parcel, while further being fully enclosed by the outer border of that particular parcel. In this way, the system requires less computational effort to process a given route on the map. A route is constructed by linking the constituent line features at their respective nodes. According to the invention, fewer line features have been divided into multiple line features when storing the map on the storage medium, So the system needs to link fewer line features to construct the route.

BRIEF DESCRIPTION OF THE DRAWINGS

The invention and its attendant advantages will be further elucidated with the aid of exemplary embodiments and the accompanying schematic drawings, whereby.

Corresponding features in the various Figures are denoted by the same reference symbols.

DETAILED DESCRIPTION OF THE PREFERRED EMBODIMENTS

Figure 1:
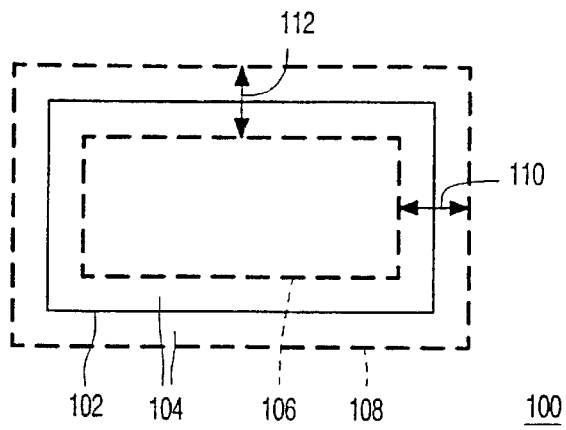
FIG. 1 shows a parcel according to the invention.

FIG. 1 shows a parcel according to the invention. The parcel 100 has a standard border 102 indicating the geographical area covered by the parcel. The parcel stores that part of the information of the digital map that corresponds to the covered area. The size of the area of the parcel may be chosen in such a way that the information stored in it does not exceed a given, predetermined amount of data. The size of the area need not be the same for all parcels, so that a parcel covering a sparsely occupied part of the map, e.g. the countryside, will cover a large area whereas a parcel covering a densely occupied part of the map, e.g. a town with its many roads, will cover a much smaller area. A digital map usually has various levels of detail of information. Such a map has for instance a detailed level with all known roads, a higher level with only the major roads, and a still higher with only motorways and freeways. The size of the area covered by the parcel may be different for different levels of the map. As an example, in an embodiment of the system of the invention the size of the parcel is 500 meters×500 meters for the detailed map of a city. The parcel has a border region 104 around the standard border 102. The border region is bounded by an inner border 106 and an outer border 108. The region is placed symmetrically around the standard border, i.e. the inner border is at the same distance to the standard border as the outer border is. In this way, in a pattern of parcels an inner border of a given parcel will coincide with the outer border of its neighboring partner and the border region is shared between the two parcels. The size of the border in one direction 110 may be chosen different from the size of the border in the other direction 112. The map contains features with a certain geographical extension. In this context, the geographical extension is the form and position of the feature, i.e. the collection of the positions of the points forming the feature. The feature may be a line feature running between two nodes, like a road between two intersections. However, the features may also be a complex feature constructed by an aggregation of line features, e.g. to model highway intersections. A line feature may include one or more intermediate points which contain attributes of the feature. Such intermediate points may be used to model the shape of the road. In that case, the line feature is a collection of straight lines running from intermediate point to intermediate point and at the ends terminated by nodes representing the intersection with other line features.

The map is stored in a number of parcels covering the extent of the map. A line feature or a complex feature may be intersected by the border of a parcel and measures must be taken to store such features in more than one parcel. In known systems this is solved for a line feature, by cutting it into two new line features and storing the two new line features into the two adjacent parcels. To this end, an additional node is placed in the map at the border between the two parcels. Now according to the invention, the number of cuts are limited by allowing a line feature to cross the standard border and by only cutting it when it completely crosses the border region. So a line feature starting in one parcel and crossing the standard border is not cut if it does not also cross the outer border of that one parcel, e.g. such feature is not cut if it terminates at a node in the border region. All simple and complex features that are located completely inside the inner border of a parcel belong to this parcel. All features starting within the inner border and crossing the outer border are divided by additional nodes. Whenever possible, an already existing intermediate point between the inner border and the outer border is used for such additional node. If no such intermediate point exists, the additional node is added at the standard to divide the feature. If more than one such intermediate point exists, the intermediate point closest to standard border is selected. A line feature belongs to a parcel if it is completely inside the standard border of that parcel. Features being completely between the inner border and outer border are assigned to one of the corresponding parcels depending on the particular situation of the road network in the environment of this area. The following situations are considered:

- it must be avoided to divide complex features such as roads and intersections whenever possible,
- it must be avoided to interrupt chains of features of the same importance in the transportation network whenever possible,
- a feature is stored in the parcel in which it has the most connections to other features. If necessary, complex features are divided at parcel borders. The application programs using a storage medium with parcels according to the invention must be able to handle complex features distributed over several parcels.

Figure 2:
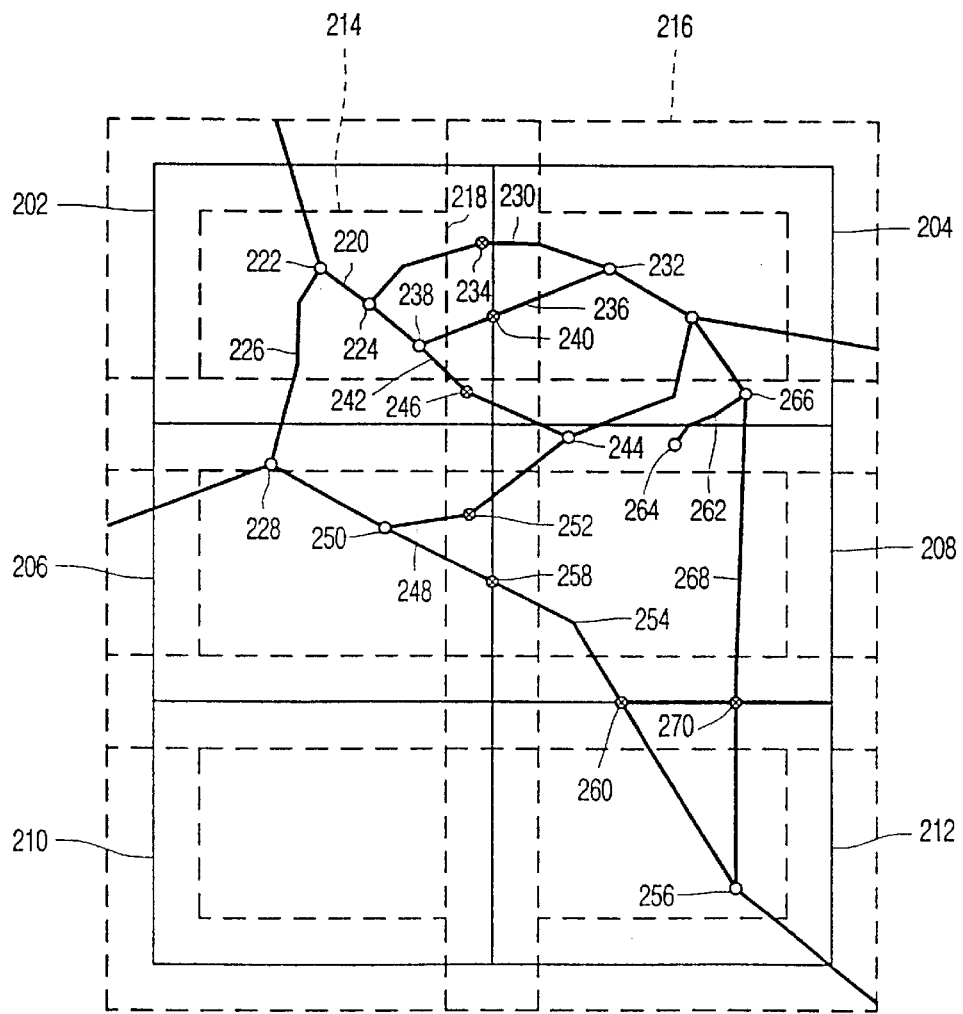
FIG. 2 gives an example of the storing of a part of a map into parcels.

FIG. 2 gives an example of the storing of a part of a map into parcels. The example has parcels 202, 204, 206, 208, 210 and 212. The parcels are arranged side by side in a pattern using the standard border to completely cover the area of the map. The inner border of one parcel coincides with outer borders of the neighboring parcels, e.g. the inner border 214 of the parcel 202 coincides with the outer border 216 of the parcel 204 over the length of line segment 218. Line feature 220 extends between node 222 and node 224. Line feature 220 is completely inside the inner border 214 of parcel 202 and is therefore stored in parcel 202. Line feature 226 extends between node 222 and node 228. Line feature 226 crosses the standard border of parcel 202 but does not cross the outer border of that parcel. Therefore line feature 226 is not divided and is stored in parcel 202. Line feature 230 extends between node 224 and node 232. Line feature 230 is in parcel 202 and parcel 204 and crosses both outer borders. Therefore it is divided by adding an additional node 234 at the existing intermediate closest to the standard border between parcel 202 and parcel 204. The new line feature extending between the node 224 and the additional node 234 is stored in parcel 202 and the new line feature extending between the additional node 234 and the node 232 is stored in parcel 204. Also the nodes terminating the respective line features are stored in the respective parcels, so in this example the additional node 234 is stored twice. The original line feature 230 as such is not stored in any of the parcels. Line feature 236 extends between node 238 and node 232 and does not contain any intermediate point. Line feature 236 is in parcel 202 and 204 and crosses both outer borders. Therefore it is divided by adding an additional node 240 at the standard border between parcel 202 and parcel 204 because no intermediate point exists in the border region. The two new line feature are stored in the respective parcels. Line feature 242 extends between node 238 and node 244 and is in parcels 202, 204 and 208. Regarding parcel 204, the line feature 242 remains in the border region of parcel 208 and there is no need to divide it in such a way in new line features that a part of it is stored in parcel 204. So line feature 242 is divided by an additional node 246 at an intermediate point closest to the standard border between parcel 202 and parcel 208. The new line feature between nodes 238 and 246 is stored in parcel 202 and the new line feature between nodes 246 and 244 is stored in parcel 208. Line feature 248 extends between node 244 and node 250 and has an intermediate point at 252. Line feature 248 is in parcel 206 and parcel 208 and where it crosses the outer border of parcel 206 it remains in the border region bounded by the outer border of parcel 208. It is divided by an additional node 252 at the intermediate point closest to the standard border between parcels 206 and 208. The line feature 254 extends between node 250 and node 256. The line feature is in parcel 206, 208 and 212 and exceeds the respective border regions between parcels 204 and 208 and between parcels 208 and 212. Therefore it is divided twice by adding two additional nodes: an additional node 258 at the standard border between parcel 206 and 208 and an additional node 260 at the standard border between parcel 208 and 212. The 3 newly created line features are stored in the parcels whose inner border they intersect. Line feature 262 extends between node 264 and node 266 and fully resides in the border region between parcel 204 and parcel 208. It is not divided and is to be stored in parcel 204 or 208. In both parcels, the line feature 262 has the same number of connections to other line features so that criterion is not decisive in this case. In this example, line feature 262 is stored in parcel 208. Line feature 268 runs between node 266 and node 256 and is in parcels 204, 208 and 212. Regarding parcel 204, the line feature 268 remains in the border region of parcel 208 and there is no need to store any part of the line feature 268 in parcel 204. Therefore, the line feature 268 is divided once by adding an additional node 270 at the standard border between parcel 208 and parcel 212. The 2 newly created features are stored in the parcels whose inner border they intersect.

Figure 3:
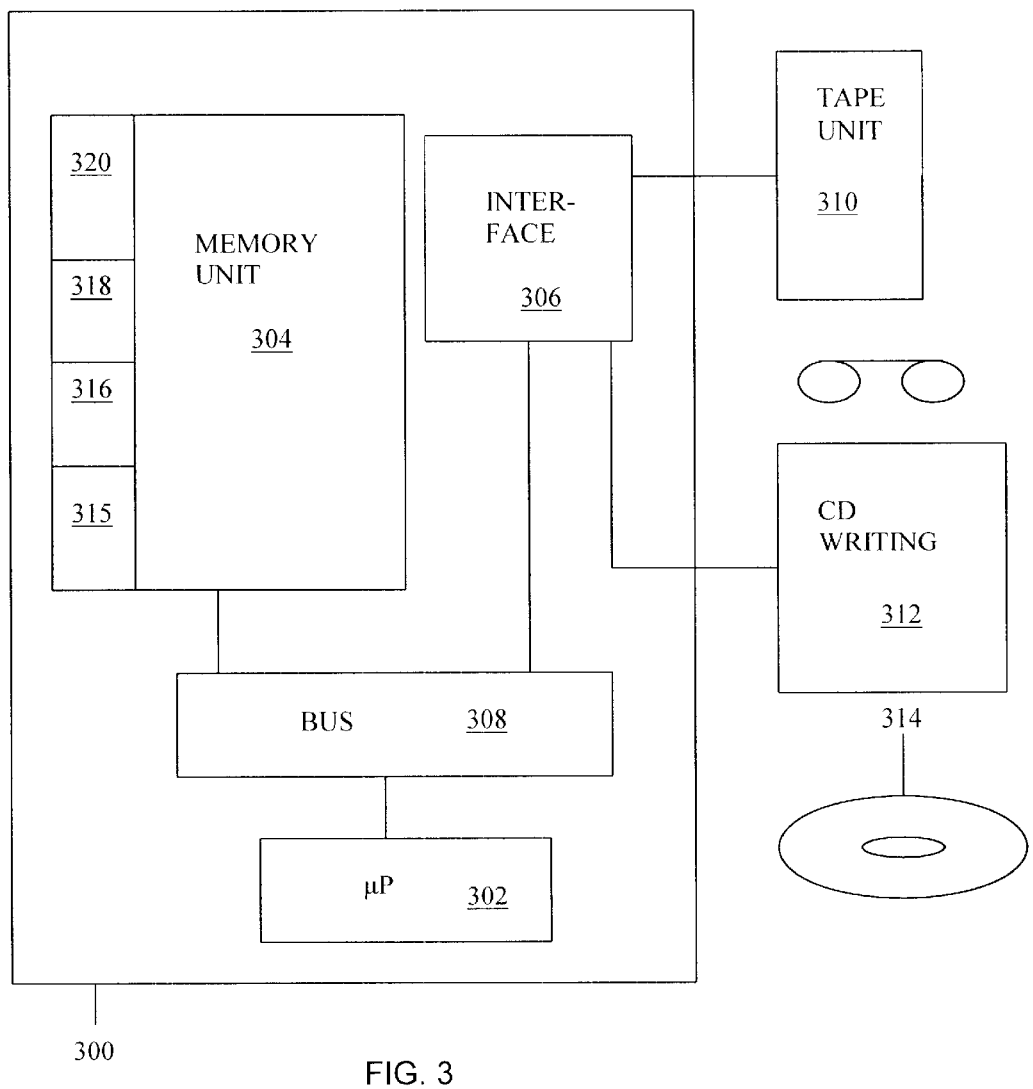
FIG. 3 schematically shows a system for storing a map on a storage medium according to the invention, FIG. 4 schematically shows a navigation system according to the invention.

FIG. 3 schematically shows a system for storing a map on a storage medium according to the invention. The system 300 is implemented according to a known architecture and may be realized on a general purpose computer. The system has a processor 302 for carrying out instructions of an application program loaded into working memory 304. The system further has an interface 306 for communication with peripheral devices. There is a bus 308 for exchange of commands and data between the various components of the system. The peripheral devices include a tape unit 310 through which the data of the digital map are entered into the system. Other types of storage device may be used for this purpose, e.g. cassette, magnetic disc or CD-ROM. Alternatively the data of the digital map may be entered into the system via some network connection to the system supplying the data. In an embodiment of the system, the data of the digital map entered into the system are in the GDF format. This is a standardized ASCII format for the exchange of geographical information comprising, among other, geometry, connectivity and attributes of the network of roads. The peripherals further include a CD writing unit 312 for writing the map in the form of the created parcels on the CD-ROM 314. Another type of storage may be used for this purpose, e.g. cassette, smart card or magnetic disc. In order to carry out the various tasks, software units are loaded into the working memory. A unit 315 is arranged for defining a pattern of parcels covering the map in such a way that each of the parcels is suitable for storing the data of the map corresponding to the area of the parcel. A unit 316 is arranged to determine the geographical extension, i.e. the shape and position of the line feature at hand and to determine whether that line feature needs to be divided among two or more of the parcels. A unit 318 is arranged to make such division if this is necessary by adding one or more additional nodes to the data of the map in such a way that the original line feature is divided into two or more new line features. The unit 318 decides whether or not to divide the line feature by determining whether the line feature is completely enclosed by the outer border of a parcel. Furthermore, the unit 318 is arranged to store the newly created line features and their nodes into the respective parcels. Finally there is a unit 320 for storing the line feature as a whole in the relevant parcel in case the line feature is not to be divided. The distribution of the functions of the system over the various units as described above is one the possible implementations. Another distribution or other units are possible.

Figure 4:
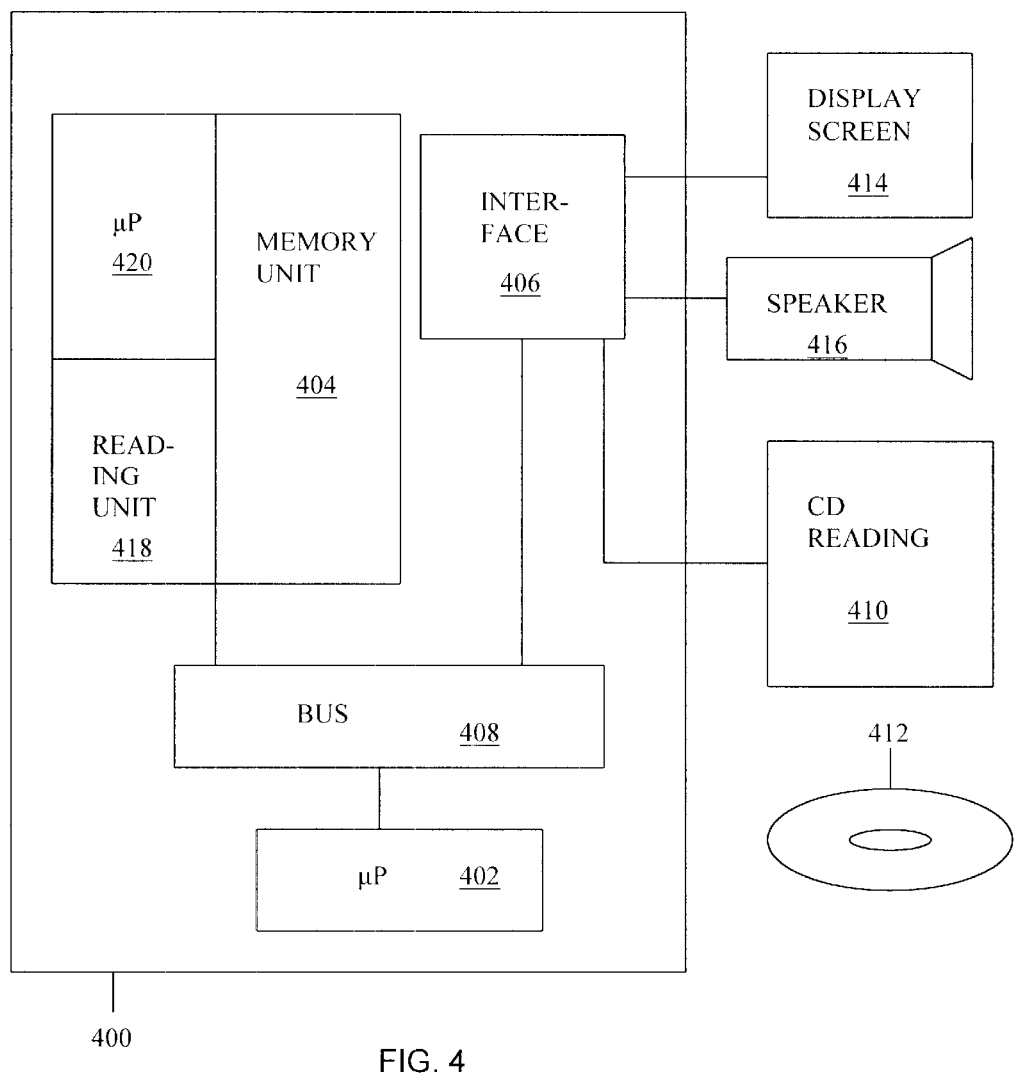

FIG. 4 schematically shows a navigation system according to the invention. The system 400 is implemented according to a known architecture and may be realized on a general purpose computer. The system has a processor 402 for carrying out instructions of an application program loaded into working memory 404. The system further has an interface 406 for communication with peripheral devices. There is a bus 408 for exchange of commands and data between the various components of the system. The peripheral devices include a reading unit 410 for reading data from a storage medium 412 comprising a digital map. This storage medium is a CD-ROM but other types of storage medium may be used, e.g. a magnetic disc or smart card. Depending on the kind of navigation system, other peripherals are connected to the system like a display screen 414 and a speaker 416. The system has a reading unit 418 for reading the data of the digital map by accessing the parcels on the storage medium. The organization of the data among the parcels is described above and shown in FIG. 2. The reading unit 418 is specifically arranged to read a line feature that intersects the standard border between two parcels. Such feature is fully enclosed by the outer border of one of the parcels but exceeds the standard border, thereby going beyond the standard area. In a traditional navigation system, the reading unit can safely assume that all feature of a parcel are within the standard border of a parcels and that a neighboring feature is always in the neighboring parcel. The system 400 further has a processing unit 420 that processes the features read from the storage medium. The nature of the processing is not relevant to the invention and is not further described in here. The processing depends on the kind of navigation system and may be the planning of a route between a starting point and a destination, using the digital map on the storage medium to know the available roads. Such route planning may be part of an application program on a Personal Computer or part of a car navigation system offering guidance to the driver. The processing unit could also display a part of the map on a display screen in a car, showing the present position of the car on the displayed map.

The geographical data on the storage medium 412 can advantageously be used by other types of system than a navigation system offering direct guidance. Another application using that data is a system implemented on a general purpose computer running an application program using the data, e.g. for retrieving tourist information related to a given route or location. A still other application is implemented using the Internet as connection network. The geographical data on the storage medium are then accessed via an Internet server and are presented to the user via a browser like program on the user's computer.

Figure 5:
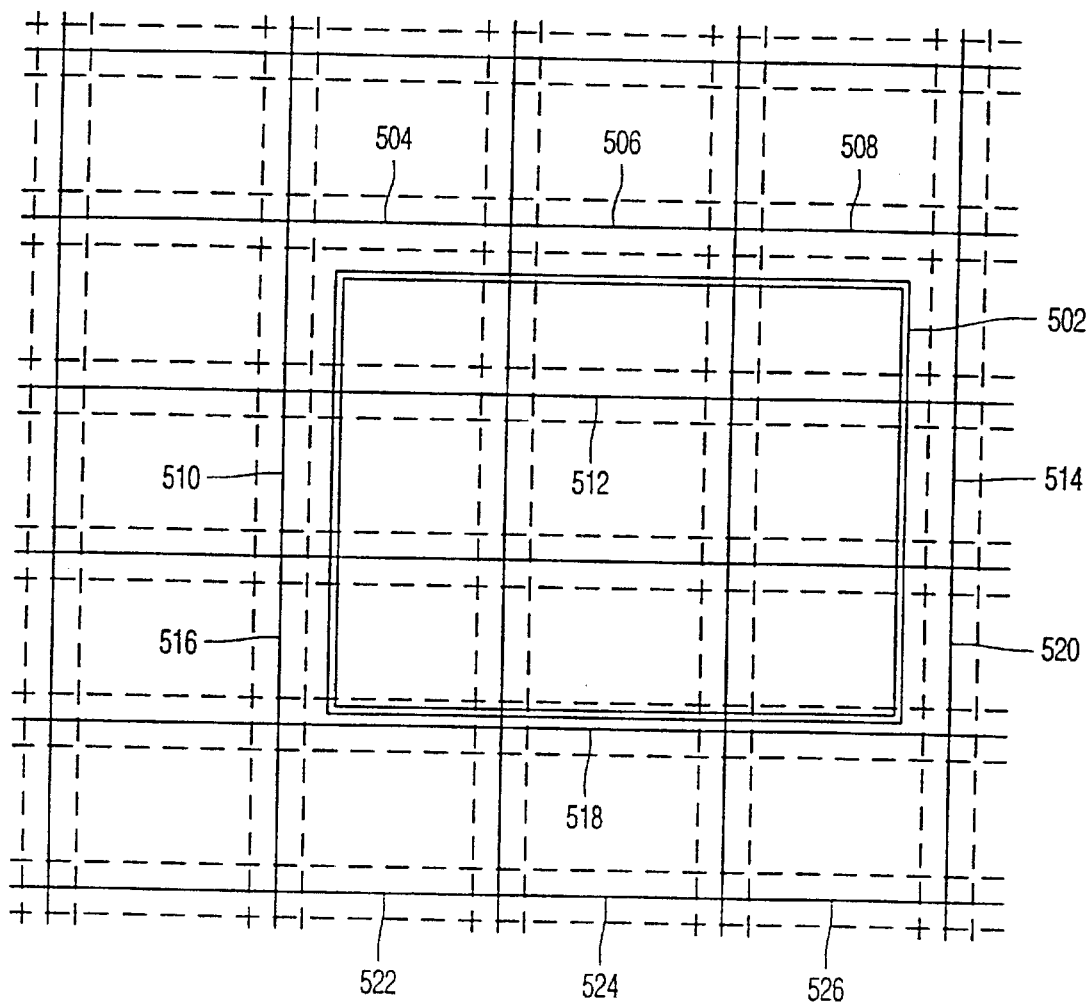
FIG. 5 shows a part of a pattern of parcels for a digital map.

FIG. 5 shows a part of a pattern of parcels for a digital map. The actual contents of the map is not shown for reasons of clarity. When a part 502 of the map is to be displayed on a display screen the parcels covering that part are to be read from the storage medium. This means that the 9 parcels 504 to 520 are to be read and their contents to be displayed as far as that falls within the frame of 502. The lower border of that frame is inside the border regions of parcels 516, 518 and 520. Some of the features in these border regions may actually not be stored in those parcels but in the parcels just below it, as is described above in relation to FIG. 2. Therefore, the parcels 522, 524 and 526 are read as well and their contents as far as that resides inside the frame of 502 is also displayed. So in general, a system displaying a map that is stored in parcels according to the invention, must be prepared that features residing in a border region of two neighboring parcels can reside in any of the two parcels irrespective of the fact whether the feature has a geographical location inside the standard border of the one or of the other parcel.

The size of the border region of the parcels for a given map determines the amount of line features that are divided among multiple parcels. A small border region makes that a relatively large amount of line features is divided resulting in a large amount of additional nodes to be stored. The advantage of a small border region is that, when accessing a given parcel, there is little chance that the neighboring parcel is to be retrieved since most of the line feature of the given parcel resides inside the inner border. A large border region makes that only few line features are divided resulting in fewer additional nodes to be stored. This saves storage space and also improves performance since fewer steps need to be made for constructing a route from the line features. The disadvantage of a large border region is the increasing chance that an extra parcel is to be retrieved to have the complete content of a given area. The size of the border region is a design parameter that can be tuned to optimize the balance between the advantage and disadvantage for a given map. The size of the border region may be different for different levels of the same map, to allow an optimal choice for each level. In practical situations the size of the border region is in the order of some tens of meters.

What is claimed is:

1. A method for storing map data, comprising the steps of:
defining a plurality of parcels of map data;
determining whether a line feature needs to be divided among two or more parcels on a basis of a geographical extension of a line feature with respect to the parcels;
adding at least one additional node in a line for dividing the line feature into multiple new line features and storing the multiple new line features in respective parcels;
and wherein a plurality of the parcels has a standard border and an inner border and an outer border, whereby the inner border of a particular parcel coincides with the outer border of its neighboring parcel; and
wherein the step of determining whether the line feature needs to be divided includes determining whether the line feature is fully enclosed by the outer border of a particular parcel and, if this is not the case, dividing the line feature.

2. A method as claimed in claim 1 wherein, if it is decided to divide the line feature between a first one and a second one of the parcels, an additional node is added to the digital map at an intermediate point of the line feature between the respective inner borders of the first one and the second one of the parcels.

3. A method as claimed in claim 1, wherein the step of determining whether the line feature needs to be divided includes determining whether the line feature is fully enclosed by the outer border of two or more of the parcels and, if this is the case, storing the line feature in the parcel with a highest number of connections to the line feature.

4. A system for storing a map comprising:
means for defining a pattern of parcels covering a map;
means for, on the basis of a geographical extension of a line feature with respect to the parcels, determining whether the line feature needs to be divided among two or more parcels;
means for adding at least one additional node to the map for dividing the line feature into multiple new line features and storing the multiple new line features in respective parcels corresponding with their respective geographical extension;
wherein each of the parcels has around its standard border a border region bounded by an inner border and an outer border, whereby the inner border of a particular parcel coincides with the outer border of its neighboring parcel; and
the means for determining whether the line feature needs to be divided determines whether the line feature is fully enclosed by the outer border of a particular parcel.

5. A system as claimed in claim 4 wherein the means for adding at least one additional node to the map adds the additional node at an intermediate point of the line feature between the respective inner borders of a first one and a second one of the parcels.

6. A system as claimed in claim 4, wherein the means for determining whether the line feature needs to be divided determines whether the line feature is fully enclosed by the outer border of two or more of the parcels and, if this is the case, stores the line feature in the parcel with a highest number of connections to the line feature.

7. A storage medium containing a map comprising:
- a plurality of map parcels, said parcels comprising a standard border region and an inner border and an outer border, whereby the inner border of a particular parcel coincides with the outer border of its neighboring parcel, and
- wherein a line feature intersects the standard border of a particular parcel while being fully enclosed in the outer border of that parcel.

8. A navigation system comprising:
- a first reading unit for accessing parcels on a storage medium comprising a digital map, the parcels forming a pattern covering the map;
- a second reading unit arranged to read at least one line feature intersecting the standard border of a particular parcel; and
- a processing unit for processing the at least one read line feature; characterized in that each of the parcels has a standard border and an inner border and an outer border, wherein the inner border of a particular parcel coincides with the outer border of its neighboring parcel.

9. A system comprising:
- a reading unit for accessing parcels on a storage medium comprising a digital map, the parcels forming a pattern covering the map;
- wherein each of the parcels has a standard border and an outer border, whereby the inner border of a particular parcel coincides with the outer border of its neighboring parcel;
- wherein the reading unit is arranged to read at least one line feature intersecting the standard border of a particular parcel, while further being fully enclosed by the outer border of that particular parcel; and
- a processing unit for processing the at least one read line feature.

* * * * *